July 29, 1958
W. F. SKILLIN
2,845,275
LEVER ACTUATED CHUCK
Filed May 23, 1955
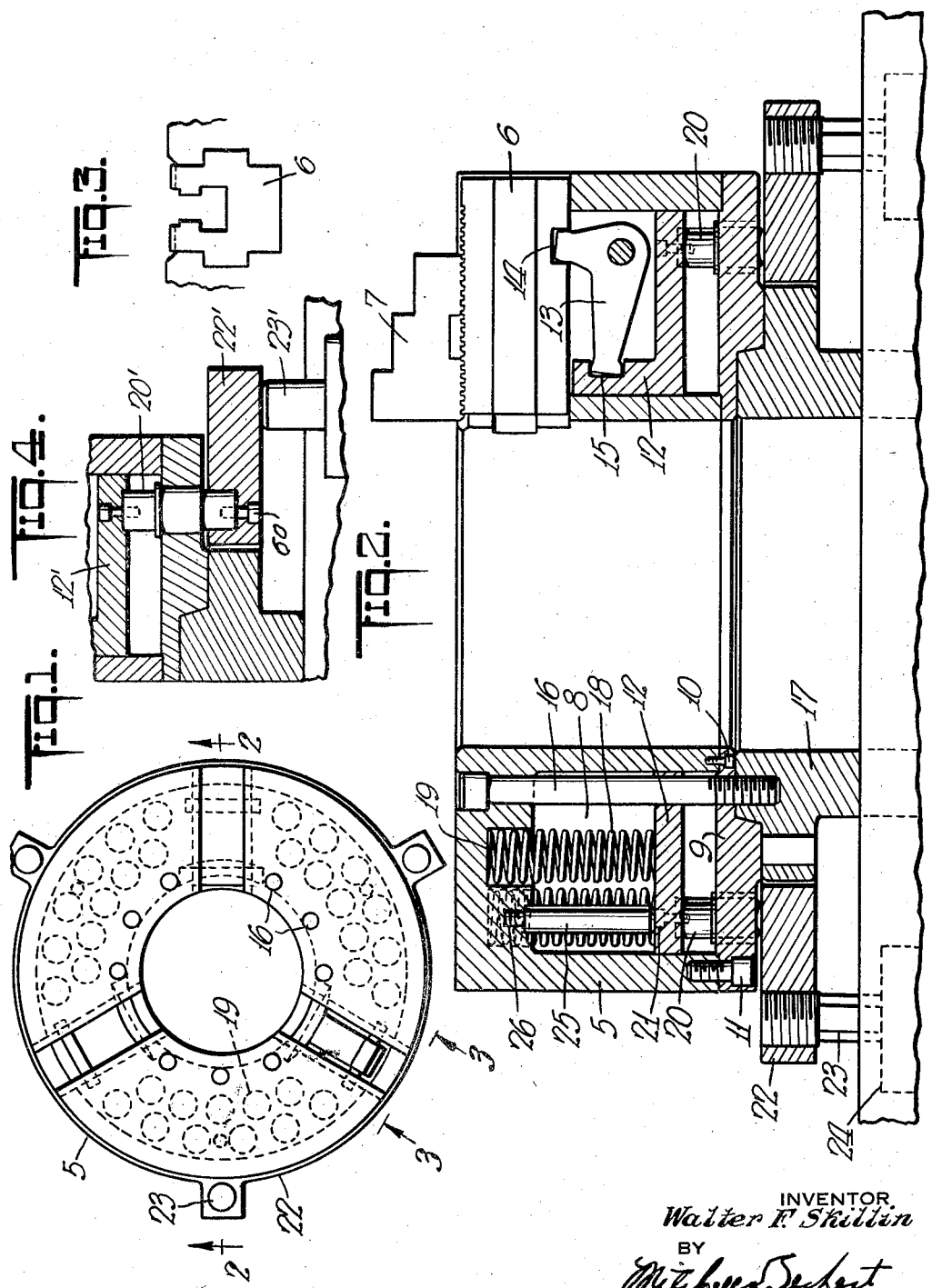
INVENTOR.
Walter F. Skillin
BY
ATTORNEYS United States Patent Office 2,845,275
Patented July 29, 1958

2,845,275

LEVER ACTUATED CHUCK

Walter F. Skillin, New Britain, Conn., assignor to Union Manufacturing Company, New Britain, Conn., a corporation of Connecticut Application May 23, 1955, Serial No. 510,125

7 Claims. (Cl. 279—119)

My invention relates to a lever actuated chuck.

It is an object to provide an improved chuck in which the jaws are held in chucked position by pre-stressed spring means.

It is another object to provide an improved power chuck having spring chucking means within a chuck body for urging the chuck jaws to chucked position, and external power means for moving the jaws against spring pressure to unchucked position.

Another object is to provide an improved, self-contained spring actuated chuck.

Other objects and various features of novelty and invention will be hereinafter pointed out or will become apparent to those skilled in the art.

Briefly stated, in a preferred form of the invention, the chuck body has one or more chuck jaws movable thereon, together with means for actuating the same. Resilient means, preferably in the form of pre-stressed spring means carried in the body, are employed for urging the chuck jaw or jaws in chucking direction and means actuable from the outside of the chuck body are provided for actuating the chuck jaws toward the unchucked position and for stressing the preloaded spring means. This unchucking movement is preferably accomplished by power means. All of the parts are arranged for economy of space and, to provide as much as possible of the operating mechanism within the chuck body itself and to provide a chuck with a large central opening for accommodation of work pieces which may have to pass into or through the center of the chuck.

In the drawings, which show, for illustrative purposes only, preferred forms of the invention:

Fig. 1 is a view in front elevation of a chuck embodying the invention;

Fig. 2 is a sectional view, on an enlarged scale, taken substantially on the line 2—2 of Fig. 1;

Fig. 3 is a fragmentary detail view showing a chuck jaw in the body and taken substantially in the plane of the line 3—3 of Fig. 1; and Fig. 4 is a fragmentary view similar to Fig. 2, illustrating a slight modification.

In the form illustrated in Figs. 1 to 3, there is a chuck body 5, which preferably has ways extending in a radial direction for slidably receiving master jaws 6, as will be understood. These jaws may carry false jaws or pads as shown at 7. The jaws are moved in chucking direction, preferably by resilient means, and in the form shown the main body member 5 is recessed so as to provide a cylinder-like chamber 8 which may extend substantially completely around the chuck body or be arranged in separate compartments between the various jaws. The chuck body is closed at the rear, in the form shown, by means of a back plate 9 secured to the chuck body as by means of screws 10—11. Within the cylinder-like chamber 8, I provide one or more actuating means 12, which may be termed piston-like, which actuator or actuators may move within the chamber 8. The actuator 12 is arranged to operate the jaws. In the form shown, the body carries a bell crank 13 for each jaw, one leg of the bell crank fitting an opening 14 in the jaw while the other leg of the bell crank fits in an opening 15 in the piston-like actuator 12. Thus, when the actuator 12 moves up and down, the bell cranks are rocked and the jaws are moved radially in and out.

If the construction does tend to permit free circumferential movement of the actuator 12, it may be desirable to provide guide means for guiding the member 12 in its cylinder chamber. In the form shown, guide members in the form of screws 16 may pass through the chamber 8 and pass through guide bores in the actuator 12 so as to guide the latter for free axial reciprocation and prevent rotation. These guide screws 16 serve also to secure the chuck body to a spindle nose or spindle nose adapter 17, as will be clear.

In order to move the jaws 7, I preferably provide resilient means, which, in the form illustrated, consist of pre-stressed coil springs 18 which may fit in blind bores 19 in the chuck body and may rest on the top or front end of the piston-like actuator 12. By increasing the number, stress and character of the springs 18, any feasible force may be obtained, tending to rock the bell crank 13 and move the jaws radially inwardly toward chucking position. By having the springs pre-loaded, it will be clear that, when they are expanded to the maximum extent permitted by the construction, that is when the piston-like member 12 abuts a stop such as the back plate 9, the jaws will be moved with the requisite heavy force in the chucking direction. In order to move the jaws to the unchucked position, I preferably provide power means which will be located preferably at the outside of the chuck body. In the form illustrated, the back plate 9 has a plurality of through bores for receiving pilot actuators 20, which may be secured to the piston-like member 12 as by means of screws 21. Thus, when the pilot actuators 20 are forced forwardly or upwardly, as viewed in Fig. 2, the piston-like member 12 will be moved forwardly so as to stress the springs 18 further and rock the bell cranks 13 in order to open the jaws 6 radially outwardly, that is, in the unchucking direction. The pilot actuators 20 are actuated by power means, preferably fluid pressure actuated piston and cylinder means.

In the form illustrated, I employ a ring 22 which surrounds the spindle nose or adapter 17 and comes up quite close to the back plate 9. The ring 22 may be carried by the piston rods 23 normally carried by pistons in the cylinders 24, as will be understood. Thus, when the piston rods 23 are moved forwardly by fluid pressure means, the ring 22 will be urged upwardly, in Fig. 2, so as to force the pilot actuators 20 to move the piston-like member 12 to further stress the springs 18 and move the jaws 6 radially to unchucking position. The movement of the piston-like member 12 upwardly in the cylinder 8 may be limited, as by means of limit abutments or screws 25 which may be screwed into the body 5, as indicated at 26, and pass down so as to be engaged by the piston-like member 12 in its forward movement.

In the form shown in Figs. 1 to 3, the ring 22 is carried by the piston rods 23 and the ring is therefore held against rotation. The pilot actuators 20 rotate with the chuck body and are engaged by the ring 22 only when the chuck has stopped. If the ring 22 is raised while the chuck is still rotating, the pilot actuators 20 will rub on the ring, but normally the ring 22 would only be forced against the actuators 20 when the chuck is stopped. That construction, however, may be varied and the ring may be carried by and rotate with the chuck body, as illustrated in the modification shown in Fig. 4. In that figure, the ring 22' is not carried by the piston rod 23' but is entirely free of it. The pilot actuators 20' are secured to the ring 22, as illustrated at 60, so that the ring 22' is actually carried by the pilot actuators 20' and the ring rotates with the chuck body. When the chuck body has been stopped and it is desired to open the chuck jaws, the piston rod 23' is actuated so as to engage the ring 22' and move the same forwardly so as to move the piston-like member 12' forwardly for opening the chuck jaws, as heretofore described.

It will be seen then that I have provided a chuck wherein the chuck jaws are resiliently yet very securely held in chucked position, and which may be moved to open position by power means on the exterior of the chuck body. The holding force of the chuck jaws may be varied by varying the number, character and stressing of the springs which move the jaws to closed position, and there will be no danger of the jaws opening up during operation on the piece carried by the chuck. The center of the chuck is free and unobstructed so as to leave a large opening for receiving any part of the work which must pass into or through the chuck body.

While the invention has been described in considerable detail and preferred forms illustrated, it is to be understood that numerous changes may be made within the scope of the invention as defined in the appended claims.

I claim:

1. In a chuck, a chuck body, a chuck jaw movable thereon, an actuator in said body, spring means for moving said actuator in one direction, a plurality of members extending through a part of said chuck body and annularly arranged and engaging said chuck actuator within said body, an annular ring external of said chuck body and engaging said plurality of members, and means for moving said ring for moving said chuck actuator.

2. In a chuck, a chuck body, a plurality of chuck jaws movable thereon, a piston-like actuator in said chuck body, means connecting said actuator and chuck jaws for moving the latter upon movement of said actuator, springs in said chuck body and urging said actuator in the chuck closing direction, plungers symmetrically arranged and off the chuck axis and engaging said actuator, and means external of said chuck body for moving said plungers in the jaw opening direction and stressing said springs.

3. In a chuck, a chuck body, a plurality of jaws movable on said body, said body having a cylinder-like chamber therein, a back plate secured to said chuck body, a piston-like actuator in said chamber, means connecting said actuator and said chuck jaws for moving the latter, spring means within said body for moving said piston-like actuator in one direction, and plunger means symmetrically arranged and off the chuck axis and extending through said back plate and actuable from the outside of the chuck body, and means external of said chuck body and engaging said plunger means for moving said actuator against the force of said spring means.

4. In a chuck, a chuck body, a plurality of chuck jaws movable thereon, said body having a cylinder-like chamber therein, a piston-like actuator in said chamber, bell cranks connecting said chuck jaws and said actuator for moving said jaws upon movement of said actuator, preloaded springs in said body and engaging said piston-like actuator for urging the same in one direction, said chuck body having a back plate, pilot means extending through said back plate for urging said piston-like actuator in a direction in opposition to the spring movement, and power means external to said chuck body for urging said pilot means.

5. In a chuck, a chuck body, a plurality of chuck jaws carried thereby, said body having a cylinder-like chamber therein, a back plate secured to said body, guide members in said cylinder-like chamber, a piston-like actuator in said chamber and guided by said guide members, means connecting said piston-like actuator and said jaws for actuating the latter upon actuation of said actuator, preloaded spring means in said chamber for urging said piston-like member in chuck jaw closing direction, pilot actuating means extending through said back plate and engaging said piston-like actuator for urging the same against said spring means, stop means for limiting the movement of said piston-like member under the influence of said pilot means, and fluid pressure actuated means at the outside of said chuck body for actuating said pilot means.

6. In a chuck, a chuck body, a plurality of chuck jaws movable thereon, said body having a cylinder-like chamber therein, a back plate on said chuck body, a piston-like actuator in said chamber, means connecting said piston-like actuator and said jaws for operating the latter by said piston-like actuator, a plurality of springs in said chamber and urging said piston-like actuator in jaw closing direction, pilot members extending through said back plate and engaging said piston-like actuator for moving the same in jaw opening direction and against the force of said spring means, a ring extending about the outside rear of said chuck body and engageable with said pilot members, and means for moving said ring axially of said chuck body for moving said pilot members and piston-like actuator in said chamber.

7. In a chuck, a chuck body, a plurality of chuck jaws movable radially thereon, a chuck jaw actuator in said chuck body and movable in an axial direction therein for moving said jaws radially upon axial movement of said chuck jaw actuator, means extending rearwardly through the back of said chuck body and cooperable with said chuck jaw actuator for moving the latter axially, a ring at the outside of and surrounding a part of the rear of said chuck body and engageable with said means extending rearwardly through said chuck body, said ring being non-rotatable, and power means for moving said ring in an axial direction.

References Cited in the file of this patent

UNITED STATES PATENTS

| | | |
|---|---|---|
| 1,364,783 | Morgan | Jan. 4, 1921 |
| 1,454,121 | Lovoie | May 8, 1923 |
| 2,597,280 | Barnes | May 20, 1952 |